March 7, 1967  R. B. WEST  3,307,570
AIR BAFFLE MANIFOLD
Filed April 21, 1964
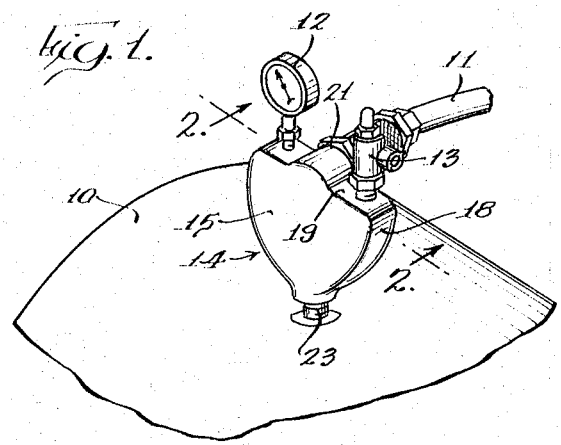
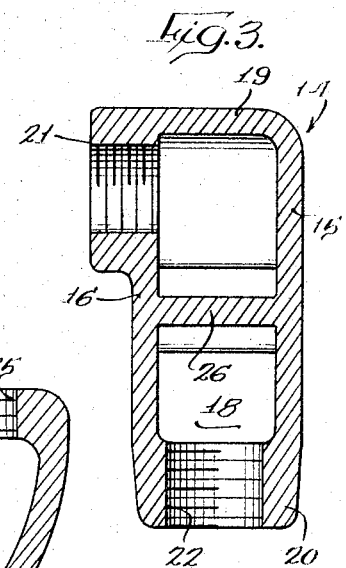
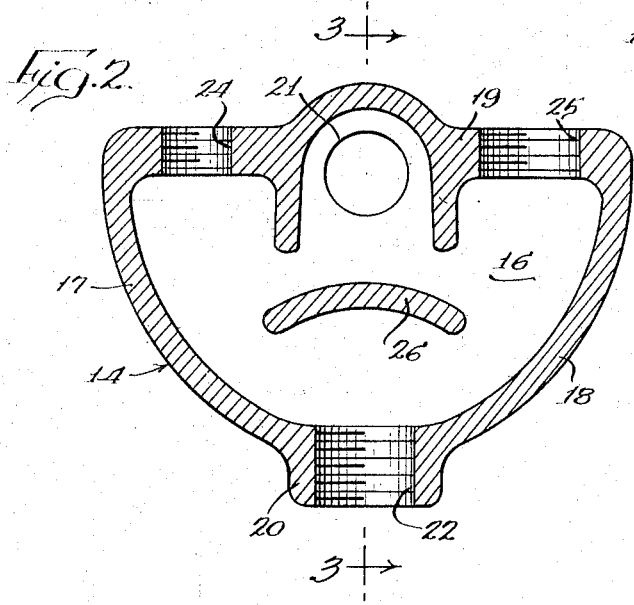
INVENTOR.
Robert B. West
BY
Hofgren, Wegner,
Allen, Stellman & McCord Attys United States Patent Office 3,307,570
Patented Mar. 7, 1967

3,307,570
AIR BAFFLE MANIFOLD
Robert B. West, Decatur, Ill., assignor to Tryco Manufacturing Company, Inc., a corporation of Illinois
Filed Apr. 21, 1964, Ser. No. 361,482
4 Claims. (Cl. 137—209)

This invention relates to an air baffle manifold and, more particularly, to such a manifold usable with tanks for corrosive fluids, such as liquid fertilizers.

In liquid chemical handling equipment, such as spraying systems for liquid fertilizers, compressed air is supplied to a tank of the liquid chemicals. For safe, reliable operation, it is conventional to associate a pressure gauge and a relief valve directly with the tank by fastening them into ports formed at the top of the tank. This has subjected these components to the splashing liquid which tends to corrode them in a short time, particularly when used with liquid fertilizers. Also, liquid fertilizers tend to crystallize, which would soon block the gauge and valve by filling the opening in the tank leading to these components.

An object of this invention is to provide a new and improved location for the gauge and valve components of a liquid chemical system.

Another object of this invention is to provide a pressure spraying system for liquid fertilizer chemicals in which components for indicating and controlling the pressure within a tank are associated with the tank at a location and in a manner to prevent contact therewith by the liquid chemicals.

Another object of the invention is to provide a structure as defined in the preceding paragraph in which an air baffle manifold mounts the components and the manifold includes a casing with an interior chamber and with ports communicating with the tank and with the components and with an interior wall extending across the chamber and over the port leading to the tank to intercept any liquid coming into the chamber from the tank and direct this liquid back to the tank without liquid contact with the ports to which components are mounted.

Further objects and advantages will become apparent from the following detailed description taken in connection with the accompanying drawings in which:

FIG. 1 is a perspective view showing the air baffle manifold and structure associated therewith mounted on a liquid chemical tank;

FIG. 2 is a vertical section on an enlarged scale of the air baffle manifold without parts associated therewith and taken generally along the line 2—2 in FIG. 1; and FIG. 3 is a vertical section taken generally along the line 3—3 in FIG. 2.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, a liquid chemical tank 10 (shown broken away) is constructed for holding chemicals, such as liquid fertilizer, and has suitable means, not shown, for supplying liquid to those lines, for spraying. The liquid is sprayed under pressure from within the tank 10, with compressed air being supplied to the tank through a fluid line 11 connected to an air compressor (not shown).

In addition to supplying compressed air to the tank 10, it is necessary to have an air pressure gauge 12 and a relief valve 13 associated with the tank 10 for safe and accurate operation. These components are standard commercially available items. The connection of the fluid line 11, gauge 12 and valve 13 are all made to the tank 10 by means of an air baffle manifold indicated generally at 14.

The air baffle manifold 14 has a front wall 15 and a rear wall 16, which are in spaced-apart relation, and connected by side walls 17 and 18, top wall 19, and bottom wall 20. These walls together define an interior chamber for the manifold.

A port 21 formed in the rear wall 16 suitably connects to the fluid line 11 whereby compressed air is directed to the interior chamber of the manifold and this compressed air enters the tank through a tank port 22 which is connected to a tank opening by means of a threaded connecting pipe 23. The tank port 22 is formed in the bottom wall 20 of the manifold to be at the bottom of the interior chamber.

The gauge 12 and valve 13 are desirably located near the top of the manifold and, as shown, are connected into a pair of ports 24 and 25, respectively, formed in the top wall 19 of the manifold casing.

With the foregoing structure, it will be seen that compressed air can readily be supplied from the line 11 to the tank 10 through the manifold 14 and that the gauge 12 and valve 13 are in fluid communication with the tank to give a proper pressure reading and to provide for safety relief upon excessive pressure. With this arrangement of structure, the gauge 12 and valve 13 are removed from the liquid chemicals in the tank so that the likelihood of contact by the chemicals is reduced. This reduces the corrosion of these components and the likelihood of their being inoperative due to crystallizing of the chemicals.

In order to render the operation of the gauge and valve even more reliable, the manifold 14 is provided with a baffle in the form of a wall 26 which extends between the front wall 15 and rear wall 16 of the manifold casing and overlies the tank port 22, as shown in FIG. 2. This wall has a width greater than the diameter of the tank port 22, so as to be contacted by any liquid rising up through the tank port into the manifold and prevent the liquid from reaching the ports 24 and 25 for the gauge 12 and valve 13, respectively. Additionally, the wall 26 is downwardly concave to assist in directing liquid rising into the manifold back to the tank port 22 for return to the tank.

Assuming a surge should occur causing fluid to rise up through the tank port 22, this fluid will normally be moving substantially vertically so as to contact the central part of the baffle wall 26. The wall 26 is of a sufficient width greater than the tank port to substantially obstruct a straight-line path from the tank port 22 to either of the ports 24 and 25 at the top of the manifold. The arcuate shape of the wall tends to direct the fluid downwardly against the lower parts of the side walls 17 and 18 of the manifold. For the foregoing reasons, there is little likelihood of fluid actually engaging the components at the upper ports.

With the foregoing description, it will be seen that a structure has been provided in which the fittings have a longer life, the pressure gauge provides a more accurate reading and the safety valve is safer.

I claim:
1. In combination, a liquid fertilizer tank for corrosive liquid and a manifold therefor, said manifold having a casing with an interior chamber, a first fluid port opening to said chamber and connecting said casing to the tank, a second fluid port in said casing for supplying compressed air to said chamber and thereby to said tank, and a pair of fluid ports at the top of the casing above the first fluid port and opening to said chamber, a pressure gauge for the tank connected to one top port, a relief valve for the tank connected to the other top port, and a baffle in the chamber overlying said first fluid port for contact by liquid splashing up from the tank and for directing said liquid back into the tank.

2. A combination as defined in claim 1 in which said baffle is wider than the first fluid port and is downwardly concave to catch liquid rising through the first port and direct it back to the port.

3. In combination, a liquid fertilizer tank for corrosive liquid and a manifold therefor, said manifold having a casing with front and rear walls connected by top, bottom and side walls defining an interior chamber, a first fluid port in the bottom wall connecting said manifold casing to the tank, a fluid port in a casing wall for supplying compressed air to said chamber and thereby to said tank, and a pair of fluid ports in the top wall of the casing, a pressure gauge for the tank connected to one top wall port, a relief valve for the tank connected to the other top wall port, and a baffle wall within the chamber extending between the front and rear walls and overlying said first fluid port for contact by liquid splashing up from the tank and for directing said liquid back into the tank without substantial fluid contact with the top wall ports.

4. A combination as defined in claim 3 in which said baffle wall is wider than the first fluid port to catch liquid rising upwardly through the first port into the chamber and direct it back to said first port.

References Cited by the Examiner
UNITED STATES PATENTS

| | | | |
|---|---|---|---|
| 790,287 | 5/1905 | Carlson | 137—209 |
| 1,201,964 | 10/1916 | Howard | 251—127 XR |
| 2,511,291 | 6/1950 | Mueller | 251—122 XR |

ALAN COHAN, *Primary Examiner.*